United States Patent
Fehlemann et al.

(10) Patent No.: US 9,200,843 B2
(45) Date of Patent: Dec. 1, 2015

(54) INJECTOR COOLING BLOCK FOR HOLDING AT LEAST ONE INJECTOR

(75) Inventors: Gereon Fehlemann, Düsseldorf (DE); Dirk Lieftucht, Legden (DE)

(73) Assignee: SMS group GMBH, Düsseldorf (DE)

( * ) Notice: Subject to any disclaimer, the term of this patent is extended or adjusted under 35 U.S.C. 154(b) by 0 days.

(21) Appl. No.: 13/580,095

(22) PCT Filed: Jan. 18, 2011

(86) PCT No.: PCT/EP2011/050625
§ 371 (c)(1),
(2), (4) Date: Oct. 5, 2012

(87) PCT Pub. No.: WO2011/101191
PCT Pub. Date: Aug. 25, 2011

(65) Prior Publication Data
US 2013/0016754 A1    Jan. 17, 2013

(30) Foreign Application Priority Data

Feb. 18, 2010 (DE) .......... 10 2010 008 508
Jun. 29, 2010 (DE) .......... 10 2010 025 562

(51) Int. Cl.
*F27D 1/12* (2006.01)
*F27B 3/24* (2006.01)
(Continued)

(52) U.S. Cl.
CPC ............. *F27B 3/24* (2013.01); *C21C 5/5217* (2013.01); *F27B 3/28* (2013.01); *F27D 1/12* (2013.01); *F27D 21/0014* (2013.01); *F27D 21/04* (2013.01); *G01K 11/3206* (2013.01); *G01K 13/02* (2013.01); *G01K 13/125* (2013.01); *G01L 1/242* (2013.01); *C21C 2005/5288* (2013.01)

(58) Field of Classification Search
USPC .......................................... 373/76, 73, 74, 75
See application file for complete search history.

(56) References Cited

U.S. PATENT DOCUMENTS 4,622,007 A * 11/1986 Gitman ............................ 432/13
6,910,431 B2 * 6/2005 Satchell, Jr. .................. 110/347
(Continued)

FOREIGN PATENT DOCUMENTS

CA    1274990    10/1990
DE    3807306    9/1989
(Continued)

OTHER PUBLICATIONS

Micron Optics, Inc, Optical_Strain_Gage, 2009.

*Primary Examiner* — Dana Ross
*Assistant Examiner* — Ayub Maye
(74) *Attorney, Agent, or Firm* — Lucas & Mercanti, LLP; Klaus P. Stoffel

(57) ABSTRACT

An injector cooling block for holding at least one injector for introducing a medium into a metallurgical vessel. The injector cooling block is arranged in or on a wall of the metallurgical vessel. The injector block has at least one plate in which a cooling channel or a cooling bore through which cooling medium can flow is arranged. The cooling channel or cooling bore separate a hot zone from a cold zone. At least one measuring element for measuring temperature and/or mechanical elongation is arranged in the hot zone. The measuring element has at least one optical waveguide which is integrated into the hot zone or fastened to the hot zone.

8 Claims, 2 Drawing Sheets

(51) Int. Cl.

| | |
|---|---|
| *C21C 5/52* | (2006.01) |
| *F27B 3/28* | (2006.01) |
| *F27D 21/00* | (2006.01) |
| *F27D 21/04* | (2006.01) |
| *G01K 11/32* | (2006.01) |
| *G01K 13/02* | (2006.01) |
| *G01K 13/12* | (2006.01) |
| *G01L 1/24* | (2006.01) |

(56) References Cited

U.S. PATENT DOCUMENTS

| | | | |
|---|---|---|---|
| 7,824,604 B2* | 11/2010 | Higgins et al. | ................ 266/241 |
| 7,876,095 B2 | 1/2011 | Knevels | |
| 2009/0074028 A1 | 3/2009 | Lamp et al. | |
| 2010/0315098 A1 | 12/2010 | Fink | |
| 2012/0237695 A1* | 9/2012 | Pye et al. | ...................... 427/554 |

FOREIGN PATENT DOCUMENTS

| | | | |
|---|---|---|---|
| DE | 102005013924 | 10/2006 | |
| EP | 0208067 B1 | 6/1989 | |
| EP | 1884731 A1 * | 2/2008 | ................ F27D 1/12 |
| RU | 2007103074 | 7/2008 | |
| RU | 2008106778 | 8/2009 | |
| WO | 9967613 | 12/1999 | |
| WO | 2004015349 A2 | 2/2004 | |
| WO | 2004015349 Y | 2/2004 | |
| WO | WO 2004015349 A2 * | 2/2004 | ............. F27B 14/20 |
| WO | 2007079894 | 7/2007 | |
| WO | 2010003694 A1 | 1/2010 | |
| WO | 2010003694 Y | 1/2010 | |

* cited by examiner

INJECTOR COOLING BLOCK FOR HOLDING AT LEAST ONE INJECTOR

The present application is a 371 of International application PCT/EP2011/050625, filed Jan. 18, 2011, which claims priority of DE 10 2010 008 508.1, filed Feb. 18, 2010 and DE 10 2010 025 562.9, filed Jun. 29, 2010, the priority of these applications is hereby claimed and these applications are incorporated herein by reference.

BACKGROUND OF THE INVENTION

The invention concerns an injector cooling block for holding at least one injector for introducing a medium into a metallurgical vessel, especially an electric arc furnace, wherein the injector cooling block is arranged in or on a wall of the metallurgical vessel, wherein the injector cooling block has at least one plate, in which is arranged a cooling channel or a cooling bore, through which a cooling medium can flow, and wherein the cooling channel or the cooling bore separates a hot zone from a cold zone.

An injector cooling block of this type is described in WO 2010/003694 A1.

The injector cooling block is a holding fixture for holding at least one injector in a metallurgical vessel, especially an electric arc furnace. The injector is used to inject media, such as gases and/or solids, into the metallurgical vessel, wherein each injector is arranged in or on the wall of the vessel over an opening in a protected way by means of the injector cooling block, which is provided with coolant channels.

The injector cooling block is usually made of copper and is provided with an internal cooling water channel. As a result of the water cooling and the great thermal conductivity of copper, the copper material is maintained at a temperature that prevents destruction of the injector cooling block inside an electric arc furnace. The injector cooling block has an opening through which gases and/or solids can be injected into the electric arc furnace by an injection system. In this regard, the injector cooling block serves to protect the injection system from mechanical stress by scrap iron and alloys, severe action of heat by radiation of the hot molten metal and the electric arc, and contact with the molten phase. In addition, as a special structural part of a furnace wall element, the water-cooled element seals the furnace chamber from the outside.

Previous solutions usually have no devices with which the temperatures and the stresses (and strains) in the housing wall of the injector cooling block can be detected. To the extent that measurements are made at all, they are carried out with a sensor that measures only at a single point.

Therefore, it is difficult or impossible to obtain reliable information about the state of the injector cooling block and the stress to which it is being subjected, especially in regard to stresses over the areal extent of the block.

It is already basically known that optical waveguides can be used for the measurement of thermal quantities, as described, for example, in WO 2004/015349 A2 and WO 2007/079894 A1, FP 0 208 067 31 proposes the use of radiation measuring instruments. Similar solutions are described in WO 99/67613 A1 and DE 38 07 306 A1.

SUMMARY OF THE INVENTION

The objective of the present invention is to further develop an injector cooling block of the aforementioned type in such a way that it would be possible to detect thermal and/or mechanical stresses of the injector cooling block and thus possible to monitor the operation of the installation more precisely. Accordingly, the invention proposes an efficient monitoring element for the injector cooling block that allows cost-effective monitoring. In this connection, it should be possible to monitor the temperatures and mechanical stresses of the injector cooling block continuously and precisely and in a cost-effective way.

The solution to this problem by the invention is characterized by the fact that at least one measuring element for measuring the temperature and/or mechanical strain is arranged in the hot zone of the plate of the injector cooling block, said measuring element comprising at least one optical waveguide that is integrated in or mounted on the hot zone; wherein the optical waveguide is arranged in a drill hole in the hot zone, said drill hole running some distance from the surface of the hot zone that faces the molten metal; or wherein the optical waveguide is arranged in a groove in the hot zone, said groove being sealed by a sealing element that holds the optical waveguide in the bottom of the groove, said sealing element being a metal part inserted in the groove or cast in the groove; or wherein the optical waveguide is arranged in a metallic layer, said metallic layer being arranged in or on the hot zone and said optical waveguide being completely surrounded by the material of the layer.

It is important for the optical waveguide to be loosely installed for a temperature measurement, so that in case of a rise in temperature, it is able to expand unhindered. Therefore, for temperature measurement, the optical waveguide is not tightly joined with the material that surrounds it. For a strain measurement, on the other hand, the optical waveguide is preferably firmly joined over its entire length with the surrounding material, so that in case of expansion of the material, the optical waveguide expands along with it to the same degree, and, in the opposite situation, i.e., in case of contraction of the material, it contracts to the same degree.

The optical waveguide can be arranged in a tube that encloses it.

Alternatively, the optical waveguides can be preinstalled in modules, i.e., in prefabricated structural units. In contrast to direct installation of the optical waveguides, the modules can be mounted on the electrode arm in a very simple way; the modules are simply mounted on the electrode arm by adhesive bonding or by welding, preferably by friction stir welding.

The metallic layer described above can be applied in or on the hot zone by electroplating. It can consist of copper, chromium or nickel.

In a preferred embodiment, the optical waveguide and the tube possibly enclosing it are installed in a meandering pattern in the hot zone in order to be able to detect temperatures and stresses/strains over the area of the plate.

The placement of optical waveguides in the walls of the injector cooling block and here especially at the cooling bores or the cooling channels makes it possible to measure temperatures and stresses of the layers of the housing as temperature or stress profiles over the surface of the part. Dynamic changes caused by flows in the melt or slag are also detected. This makes it possible to assess the state of wear and the existing flow-stress situation of the injector due to the temperature and/or stress. The proposed concept makes it possible to describe the thermal and mechanical stress on the injector over its surface in the given operating state.

To make it possible to carry out exact measurements with the optical waveguide, it is advantageous for the optical waveguide or the metal tube that encloses the optical waveguide to lie close against the part or medium and, in particular, if at all possible, without an (insulating) air gap.

This is especially applicable if the temperature is to be determined by optical waveguide in the injector cooling block.

To make it possible for an expansion (stress) of the wall of the injector cooling block also to be measured, it is advantageous if the optical waveguide or the tube enclosing it is firmly joined with the bore or the bottom of the groove.

If a groove is provided, in which the optical waveguide or the tube enclosing it is installed, it is preferably provided that a filler piece, which can be made of metal, is used for sealing the groove. It can be designed to conform precisely to the shape of the groove. In this regard, it can also be provided that the filler piece is produced by casting or injection of the material of the filler piece into the groove. Thus, in this case, the material of which the filler piece consists is made castable or injectable and then cast or injected into the groove in which the optical waveguide, which is possibly enclosed in a tube, was inserted.

The proposed design offers the possibility of detecting stress states in the measured plane and thus determining the mechanical load on the parts.

The technology of the measurement of temperatures and strains or stresses in itself is already well known (including under the term "optical strain gages"), so that in this respect the relevant prior art can be consulted.

The optical waveguide is preferably connected with an evaluation unit, in which the temperature distribution in the wall of the injector cooling block can be determined. This evaluation unit can also be similarly used to determine the mechanical load on the wall of the injector cooling block.

A specific embodiment of the invention is illustrated in the drawings.

DETAILED DESCRIPTION OF THE INVENTION

Figure 1:
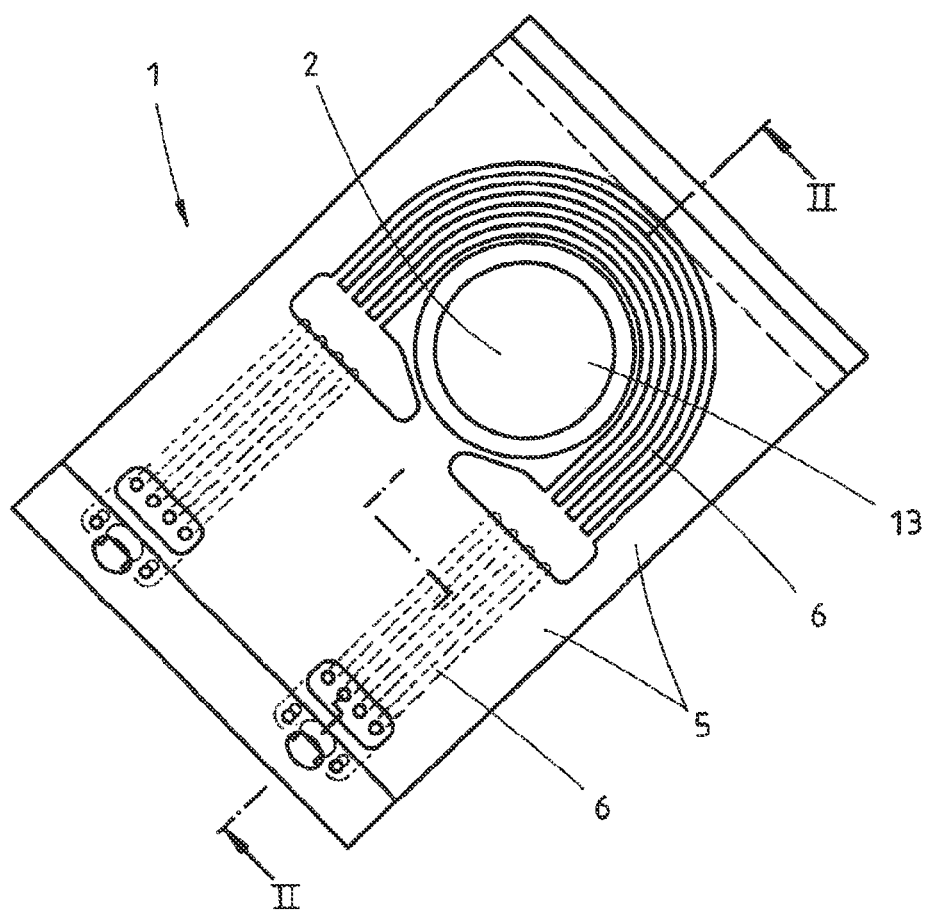
FIG. 1 is a view "A" (see FIG. 2) of an injector cooling block of an electric arc furnace.
Figure 2:
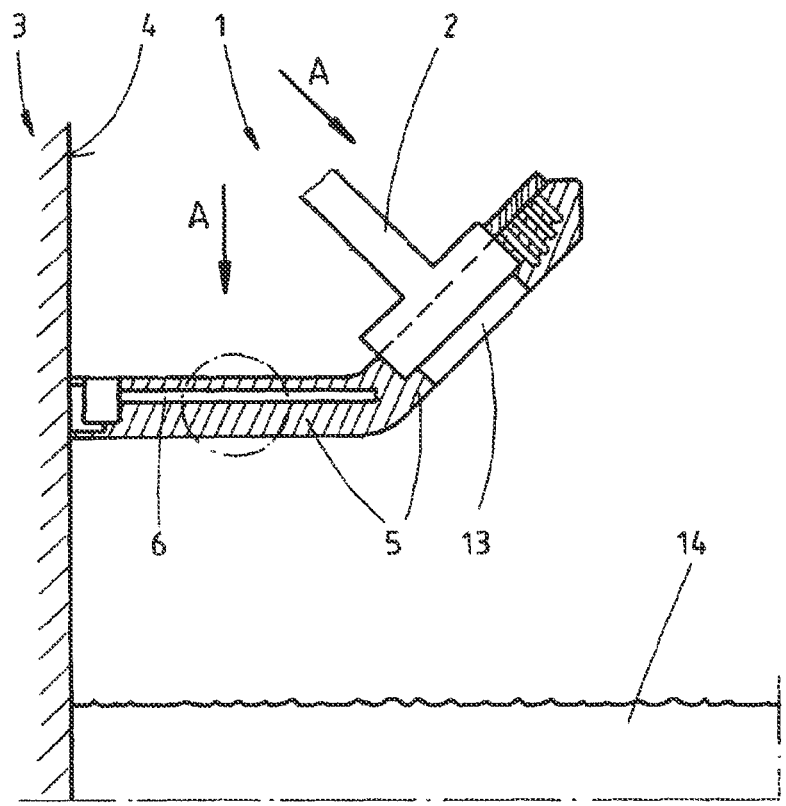
FIG. 2 shows the injector cooling block along sectional line II-II in FIG. 1.

FIGS. 1 and 2 show an injector cooling block 1, which serves as a holding fixture for holding an injector 2 in a metallurgical vessel 3, which in the present case is realized as an electric arc furnace. The injector 2 is used to introduce media, such as gases and/or solids, into the metallurgical vessel 3, wherein the injector 2 is arranged in or on the wall 4 of the vessel 3 over an opening 13 in a protected way by means of the injector cooling block 1, which is provided with coolant channels 6.

The injector cooling block 1 consists of a strongly heat-conducting, hot rolled and/or forged material, such as copper or a copper alloy (e.g., CuAg, CuCrZr, or CuNiBe). Accordingly, it is provided that in the production of the injector cooling block 1, a strongly heat-conducting material, e.g., copper or a copper alloy, is formed and hot work hardened by hot rolling and/or forging. In this way, a material with very good homogeneity, high thermal conductivity and great strength is obtained in a simple way by the rolled or forged, strongly heat-conducting material, such as copper. In addition, the injector cooling block 1 can be formed by cold work hardening by forging and/or rolling.

The illustrated injector cooling block 1 consists of two plates 5 arranged at an angle to each other, which are produced from a common plate element. In this regard, the plate 5 can be bent at a predetermined angle by means of a bending device.

Figure 3:
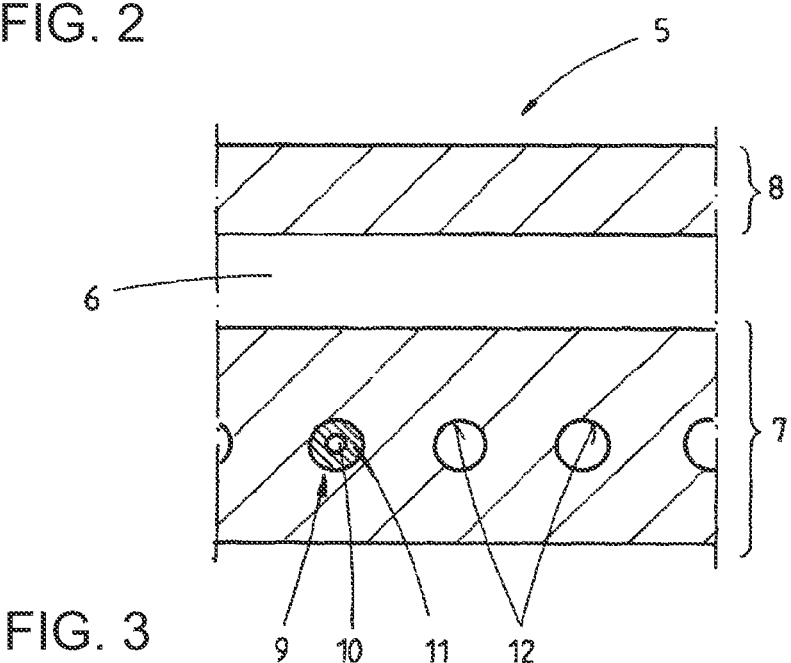
FIG. 3 shows the detail "X" according to FIG. 2.

FIG. 3 shows an example of the structure of a plate 5 of the injector cooling block 1. The plate 5 can be divided into a hot zone 7 and a cold zone 8, with the two zones 7, 8 being divided by or separated from each other by a cooling channel 6.

The hot zone 7 of the plate 5 is provided with bores 12, in which a measuring element 9 is placed (shown for only one bore but provided for all bores 12), with which the temperature and/or the mechanical stress in the plate 5 can be determined. This measuring element 9 is an optical waveguide 10, which is housed in a tube 11, which serves to protect it.

The optical waveguide 10 typically has a diameter of, e.g., 0.12 mm; with the enclosing tube 11, the overall diameter is usually in the range of 0.8 mm to 2.0 mm.

As FIG. 3 shows, the optical waveguide is thus installed in the hot zone 7, which is cooled on the rear side by the cooling medium, which is passed through the cooling channel 6.

The optical waveguide 10 consists of a primary fiber, which is placed in the bores 12 or in similar channels or grooves. In this regard, the optical waveguide 10 can withstand continuously high temperatures up to 800° C.

In order to increase the robustness of the signal transmission in the optical waveguide 10 and to evaluation units (not shown), the light waves are guided by fiber optic lens connectors from the shell of the metallurgical vessel 3 in the given rest position to the evaluation unit.

In addition to the described possibility of installing the optical waveguide 10 in bores 12, there is also the preferred possibility of incorporating a groove in the hot zone 7 of the plate 5 and laying the optical waveguide 10 (possibly together with a tube 11) in the bottom of the groove. The groove can then be sealed again, and the measures mentioned above can be used for this purpose.

Another possibility is to place the optical waveguide 10—possibly together with the tube 11—in a metallic layer, which is applied on the front side of the plate 5 or hot zone 7, i.e., the side facing the inside of the vessel 3, i.e., the side facing the melt 14.

The layer can be applied by electroplating to completely cover the optical waveguide 10 along with the tube 11. The electroplated layer can consist, for example of copper, chromium or nickel.

If the optical waveguide 10 is installed in a meandering pattern, the surface area of the plate 5 can be monitored very well with respect to the temperature distribution and mechanical stresses.

The optical waveguide 10 is connected with a temperature acquisition system and an acquisition system for mechanical stresses and strains (not shown). The acquisition system generates laser light, which is fed into the optical waveguide 10. The data collected by the optical waveguide 10 are converted by the acquisition system to temperatures or stresses and assigned to the various measurement locations.

The evaluation can be carried out, for example, by the Fiber Bragg Grating method (FBG method). In this method, suitable optical waveguides are used, which are given measuring points inscribed with a periodic variation of the refractive index or grating with such variations. Due to this periodic variation of the refractive index, the optical waveguide constitutes a dielectric mirror as a function of the periodicity for certain wavelengths at the measuring points. A temperature change at a point causes a change in the Bragg wavelength, with exactly this wavelength being reflected. Light that does not satisfy the Bragg condition is not significantly affected by the Bragg grating. The different signals of the various measuring points can then be distinguished from one another on the basis of differences in transit time. The detailed structure of such fiber Bragg gratings and the corresponding evaluation units are well known. The accuracy of the spatial resolution is determined by the number of inscribed measuring points. The size of a measuring point can be, for example, in the range of 1 mm to 5 mm.

Alternatively, temperature measurement can also be made by the Optical Frequency Domain Reflectometry method (OFDR method) or the Optical. Time Domain Reflectometry method (OTDR method). These methods are based on the principle of fiber optic Raman backscattering, which exploits the fact that a temperature change at the point of an optical waveguide causes a change in the Raman backscattering of the optical waveguide material. The temperature values along a fiber can then be determined with spatial resolution by means of the evaluation unit (e.g., a Raman reflectometer), such that in this method an average is taken along a certain length of the waveguide. This length is about a few centimeters. The different measuring points are in turn separated from one another by transit time differences. The design of such systems for evaluation by the specified methods is already well known, as are the lasers needed to produce the laser light within the optical waveguide 10.

LIST OF REFERENCE NUMBERS 1 injector cooling block
2 injector
3 metallurgical vessel (electric arc furnace)
4 wall
5 plate
6 cooling channel/cooling bore
7 hot zone
8 cold zone
9 measuring element
10 optical waveguide
11 tube
12 bore
13 opening
14 melt

The invention claimed is:

1. Injector cooling block (i) for holding at least one injector (2) for introducing a medium into a metallurgical vessel (3), wherein the injector cooling block (i) is arranged in or on a wall (4) of the metallurgical vessel (3), wherein the injector cooling block (i) has at least one plate (5), in which is arranged a cooling channel or a cooling bore (6), through which a cooling medium can flow, and wherein the cooling channel or the cooling bore (6) separates the least one plate into a hot zone (7) and a cold zone (8), wherein at least one measuring element (9) for measuring temperature or mechanical strain or temperature and mechanical strain is arranged in the hot zone (7), said least one measuring element (9) comprising at least one optical waveguide (10) that is integrated in or mounted on the hot zone (7); wherein the least one optical waveguide (10) is arranged in a metallic layer, said metallic layer being arranged in or on the hot zone (7) and said least one optical waveguide (10) being completely surrounded by and, for strain measurement, firmly joined and in direct contact with a material of the metallic layer over an entire length of the least one optical waveguide (10).

2. Injector cooling block in accordance with claim 1, wherein the measuring element (9) in the form of the optical waveguide (3) is arranged, for the purpose of temperature measurement, loosely in or on the injector block in such a way that the optical waveguide is free of tension and can move freely, or, for the purpose of strain measurement, the optical waveguide is arranged in such a way that the optical waveguide is firmly joined with the material of the injector cooling block to allow the strains the optical waveguide undergoes to be recorded.

3. Injector cooling block in accordance with claim 1, wherein the layer is applied in or on the hot zone (7) by electroplating.

4. Injector cooling block in accordance with claim 1, wherein the layer consists of a metal, especially copper, chromium or nickel.

5. Injector cooling block in accordance with claim 1, wherein the optical waveguide (10) and the tube (11) possibly enclosing the optical waveguide are installed in a meandering pattern in the hot zone (7).

6. Injector cooling block in accordance with claim 2, wherein the optical waveguide (3) is arranged in a module, which is firmly connected with the plate (5), such that the optical waveguide is arranged, for the purpose of temperature measurement, in such a way that the optical waveguide is free of tension and can move freely, or, for the purpose of strain measurement, in such a way that the optical waveguide is firmly embedded in the module.

7. Injector cooling block in accordance with claim 2, wherein, for the purpose of temperature measurement, the optical waveguide (10) is laid loosely in a tube (11) that encloses the optical waveguide and is embedded in the metallic layer, or, for the purpose of strain measurement, the optical waveguide (10) is arranged in the material without an enclosing tube with direct contact with the material.

8. Injector cooling block in accordance with claim 2, wherein an entire length of the optical waveguide is firmly joined with the material of the injector cooling block.

* * * * *